United States Patent Office 3,532,741
Patented Oct. 6, 1970

3,532,741
AMINO, MONOMETHYLAMINO AND DIMETHYLAMINO DERIVATIVES OF DECAHYDRO-1,5,2,4 - ETHANEDIYLIDENECYCLOPENTA[cd] PENTALENE
Tadamichi Fukunaga, Wilmington, Del., assignor to E. I. du Pont de Nemours and Company, Wilmington, Del., a corporation of Delaware
No Drawing. Filed May 27, 1964, Ser. No. 370,706
Int. Cl. A61k 21/00, 27/00; C07c 87/40
U.S. Cl. 260—501.1                                4 Claims

ABSTRACT OF THE DISCLOSURE

Described and claimed are amine derivatives of the hydrocarbon, decahydro - 1,5,2,4 - ethanediylidenecyclopenta[cd]-pentalene, produced by reacting the product of the hydrocarbon and cyanogen azide with LiAlH$_4$. These compounds are antiviral agents.

DESCRIPTION OF THE INVENTION

This invention relates to amino, monomethylamino and dimethylamino derivatives of decahydro-1,5,2,4-ethanediylidenecyclopenta[cd]pentalene and their preparation. More particularly, the invention is directed to novel antiviral compositions comprising said derivatives.

The compounds of the present invention can be represented by the following formula

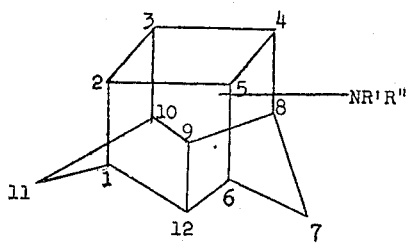

(1)

wherein R' and R'' can be the same or different and are selected from the class consisting of hydrogen and methyl. The amino and methylamino substituents can be positioned on any of the carbons of the polycyclic or birdcage hydrocarbon skeleton, i.e., decahydro-1,5,2,4-ethanediylidenecyclopenta[cd]pentalene, also known as hexacyclo[7.2.1.-O$^{2,5}$.O$^{3,10}$.O$^{4,8}$.O$^{6,12}$]dodecane. Since the tertiary hydrogen atoms of the bird-cage hydrocarbon are attacked or replaced by the —NR'R'' substituent (where R is hydrogen or CH$_3$) about seven times faster than the secondary ones, the amine substituents are more apt to be found on bridgehead carbons. However, in the compositions of the invention, there are substituents on substantially all of the carbon atoms. In other words, here are compositions falling within the scope of my invention which contain some of all possible isomeric products of which there are fifteen (five NH$_2$—, five CH$_3$NH— substituted products and five (CH$_3$)$_2$N— substituted products) as shown below.

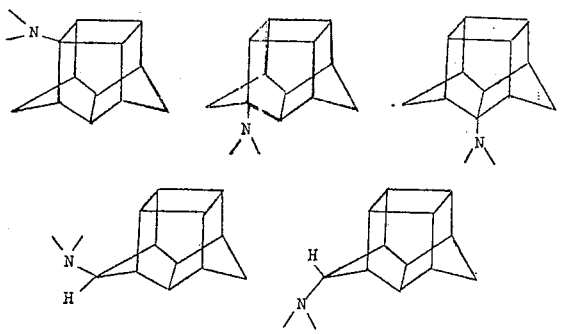

The embodiments of this invention which relate to amine mixtures generally contain from 10 to 90% by weight of the compounds of Formula 1, wherein both R's are hydrogen, the remainder of the mixture being compounds of Formula 1 wherein at least one of the R's is methyl. In the preferred compositions, there are more methylamino derivatives present than amino derivatives of decahydro-1,5,2,4-ethanediylidenecyclopenta[cd]pentalene The products of the present invention are prepared from the bird-cage hydrocarbon which is an old compound. Its preparation and some of its properties are set forth in an article by P. Bruck, D. Thompson and S. Winstein, entitled "Dechlorination of Isodrin and Related Compounds," beginning on page 405 of the Apr. 9, 1960 issue of Chemistry & Industry. Its chemistry is further elaborated in an article by Louis De Vries and S. Winstein, J. Am. Chem. Soc. 82, 5363 (1960).

In the process of the invention, the bird-cage hydrocarbon, decahydro-1,5,2,4-ethanediylidenecyclopenta[cd] pentalene, is reacted with cyanogen azide in a solvent preferably methylene chloride. Other solvents such as ethyl acetate and acetonitrile may be used. The resulting product is then treated with lithium aluminum hydride in the presence of a solvent such as, for example, tetrahydrofuran.

WARNING: Cyanogen azide, a reactant in this invention, is explosive when free or nearly free of solvent and should be handled with great care. It can be used, however, with comparative safety in dilute or moderately concentrated solution.

Since the compounds of Formula 1 contain basic amine groups, they form nontoxic salts with acids and such salts are included within the scope of this invention. These salts enhance the pharmaceutical application of the compositions. Representative of such salts are the hydrochloride, hydrobromide, sulfate, phosphate, acetate, lactate, succinate, propionate, pamoate, tartrate, salicylate, citrate and bicarbonate. Of these, the hydrochloride and acetate are preferred. Other salts include those with caprochlorone and with penicillin.

The preparation of the salts of the amino and methylamino derivatives of Formula 1 can be carried out by dissolving said derivatives in a suitable solvent, e.g., water, ethyl ether, and the like, containing 1 or more equivalents of an acid. The resulting material can be concentrated in vacuo at moderate temperatures to yield a solid salt composition such as, for instance, the hydrochloride.

The compounds of this invention have broad antiviral effectiveness as illustrated by activity in tissue culture tests, and in mice against such influenza as Influenza A, Influenza A–2 (Michigan A/AA), and Influenza D Sendai).

The compounds of Formula 1, preferably in salt form, can be administered in the antiviral treatment according to this invention by any means that effects contact of the compound with the site of virus infection in the animal organism. It will be understood that this includes the site prior to infection setting in as well as after. For example, administration can be parenterally, that is, subcutaneously, intravenously, intramuscularly, or intraperitoneally. Alternatively or concurrently, the compounds are effective on administration by the oral route. Since they are particularly effective against viral influenza, administration can be by vapor or spray through the mouth or nasal passages.

The dosage administered will be dependent upon the age, health and weight of the recipient, kind of concurrent treatment if any, frequency of treatment, and the nature of the effect desired. Generally, a daily dosage of active ingredient compound will be from about 0.1 to 200 milligrams per kilogram of body weight, although lower, such as 0.05 milligrams, or higher amounts can be used. Ordinarily, from 0.5 to 50, preferably 1 to 20, milligrams per kilogram per day, in one or more applications per day, is effective to obtain the desired result.

The compounds of Formula 1 can be employed in useful pharmaceutical compositions according to the present invention in such dosage forms as tablets, capsules, powder packets, or liquid solutions, suspensions, or elixirs, for oral administration, or liquid solutions for parenteral use, and in certain cases, suspensions for parenteral use (except intravenous). In such compositions, the active ingredient, i.e., a compound of Formula 1, will ordinarily always be present in an amount of at least 0.0001% by weight based on the total weight of the composition and not more than 99% by weight.

Besides the active amine compounds of Formula 1, the composition can contain a solid or liquid nontoxic pharmaceutical carrier for the active amine derivatives. Mixtures with one or more pharmaceutically active materials can, of course, be used.

Suitable pharmaceutical carriers are described in "The Pharmacological Basis of Therapeutics" by L. G. Goodman and A. Gilman, a well-known reference text in this field.

Prophylactic as well as therapeutic treatment is contemplated as within the purview of the present invention.

The following detailed examples further illustrate the present invention and are not to be construed as limiting in any way its scope.

EXAMPLE I

A suspension of sodium azide (3.0 g.) in cyanogen chloride (40 ml.) was allowed to reflux (15° C.) with stirring overnight. Methylene chloride (about 100 ml.) was then added, the excess cyanogen chloride removed and the suspension pressure filtered under nitrogen. To the filtrate was then added methylene chloride to a total volume of 200 ml. This analyzed as 9.5 ml. of gas per 2 ml. of solution. Decahydro-1,5,2,4-ethanediylidenecyclopenta[cd]pentalene (10 g.) was then added and the resulting solution stirred at about 46° C. for approximately 46 hours. The total evolution of nitrogen amounted to 890 ml. Removal of the solvent under diminished pressure gave a dark red semisolid which displayed strong infrared absorption at 2210 and 3210 cm.$^{-1}$.

Conversion of this material to a mixture of amines was accomplished as follows: A solution of the semisolid in tetrahydrofuran (50 ml.) was added, with stirring and over a period of 1 hour to a boiling suspension of lithium aluminum hydride (5 g.) in tetrahydrofuran (150 ml.). The mixture was maintained at the reflux temperature with stirring for an additional 15 hours. The suspension was then cooled in an ice salt mixture and treated carefully with a saturated solution of sodium sulfate, until the precipitate had turned completely white. The suspension was then filtered, the clear filtrate made strongly acid with 25 ml. of concentrated hydrochloric acid and evaporated to dryness at about 60° C. The residual hygroscopic, slightly tan, solid comprising a mixture of amino and monomethylamino derivatives of decahydro-1,5,2,4-ethanediylidenecyclopenta[cd] pentalene, amounted to 1.2 g.

EXAMPLE II

A solution of 1.8 g. of a crude mixture of amino- and monomethylaminohexacyclododecane hydrochlorides prepared as in Example I and 1.0 g. of sodium bicarbonate in 4.0 ml. of 98% formic acid and 2.5 ml. of 36% formaldehyde solution was refluxed under nitrogen for 17 hours. After cooling to 25° C. 10 ml. of 2 N hydrochloric acid was added and the mixture was washed with ether twice. The aqueous solution was concentrated under reduced pressure, made strongly basic with potassium hydroxide pellets and extracted three times with ether. The combined ethereal extracts were washed once with saturated sodium chloride solution and dried over potassium hydroxide pellets. After evaporation of the solvent, the slightly colored residual oil (0.8 g.) was distilled to give a mixture of dimethylamino derivatives of decahydro-1,5,2,4-ethanediylidenecyclopenta[cd]pentalene (0.5 g.) as a colorless oil, B.P. 73–79° C. at 0.4 mm.; mass spectrometric molecular weight, 201; I.R., no absorption below 3.2μ, strong bands at 3.54 and 3.60μ (C–H stretching of N-dimethyl) and at 4.6μ (C–N stretching).

The yellow picrate prepared in ether-ethanol decomposed slowly above 170° C. and melted below 210° C. An analytical sample prepared by two recrystallizations from aqueous alcohol melted similarly.

*Analysis.*—Calc'd for $C_{20}H_{22}N_4O_7$ (percent): C, 55.81; H, 5.16; N, 13.02. Found (percent): C, 55.54; H, 5.43; N, 12.54.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds of the formula

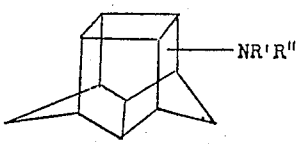

wherein R' and R" are selected from the class consisting of hydrogen and methyl.

2. An amine mixture consisting of compounds of claim 1 wherein from 10–90% by weight of the mixture is composed of compounds in which R' and R" are hydrogen.

3. Hydrochloride, hydrobromide, sulfate, phosphate, lower aliphatic carboxylate, tartrate, salicylate, citrate or bicarbonate acid addition salts of compounds of claim 1.

4. Compounds of claim 1 wherein R' and R" are methyl.

References Cited

De Vries et al.: Journ. of American Chemical Society, vol. 82, September-October 1960, pp. 5363, 5369, 5370.

Chemistry and Industry, May 15, 1954.

Gaylard, Reduction with Complex Metal Hydrides, 1956, pp. 780.

FLOYD D. HIGEL, Primary Examiner

U.S. Cl. X.R.

260—239.1, 349, 501.11, 501.16, 563; 424—316, 325